June 26, 1934.  A. P. CISNEROS  1,964,452
MARINE VEHICLE
Filed Sept. 6, 1933  2 Sheets-Sheet 1

INVENTOR
Arturo León Cisneros
BY
Edwards, Bower & Pool
ATTORNEYS

June 26, 1934.  A. P. CISNEROS  1,964,452
MARINE VEHICLE
Filed Sept. 6, 1933   2 Sheets-Sheet 2

INVENTOR
Arturo León Cisneros
BY
Edwards, Bower & Pool
ATTORNEYS

Patented June 26, 1934

1,964,452

UNITED STATES PATENT OFFICE 1,964,452

MARINE VEHICLE

Arturo Peón Cisneros, Mexico, Mexico

Application September 6, 1933, Serial No. 688,287
In Mexico May 15, 1933

6 Claims. (Cl. 115—19)

This invention relates to marine vehicles and its main object is to provide a vehicle in which the body of the vehicle does not float itself in usual manner but instead is supported on axles or shafts which in turn are supported by floating members.

These floaters constitute the bases of support of the car or body part and act to produce its advance over the surface of the water by the employment of mechanical driving means as already known, the floaters being buoyant and rotatable so as to provide for the advance of the vehicle over the water whether the advance is attained by one or more propellers or by rotation of the floaters themselves or combination of both driving means.

In contradistinction to the usual method of marine propulsion, it will be clearly seen that this new vehicle is different since the others invariably consist of a hull floating in the water and sliding through it whereas the present device has no floating hull. Due to this radical difference between the former ships and the present marine vehicle, the latter is able to attain much higher speeds than those attained up to the present time because the shock of the mass of waters against the hull of the ship is eliminated.

Figure 1:
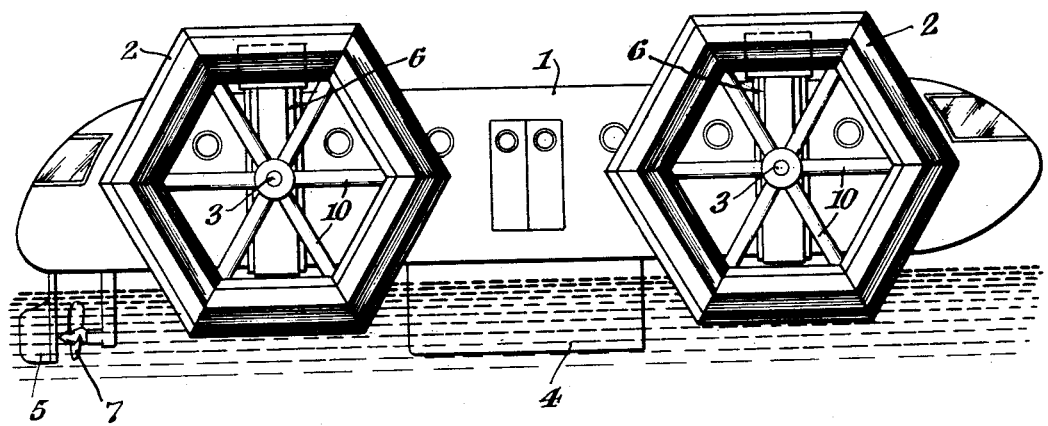
Figure 2:
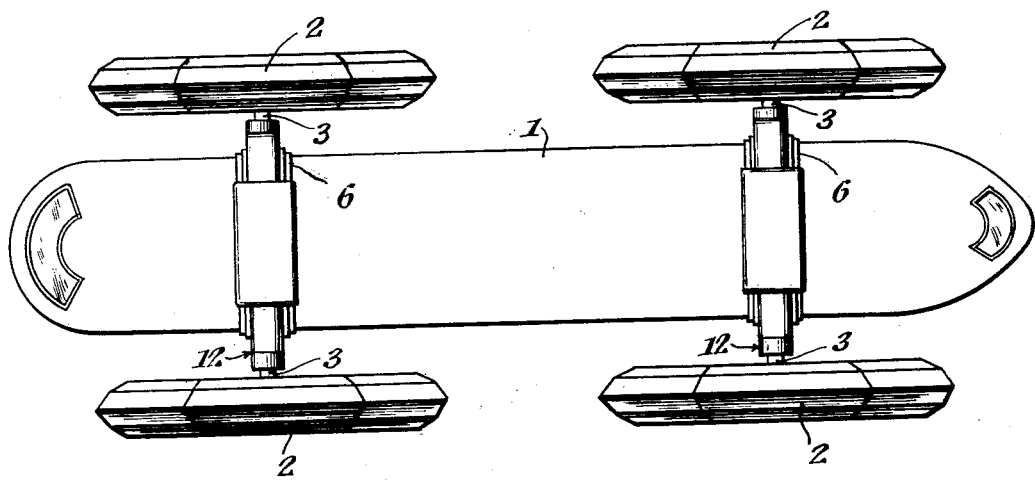
Figure 3:
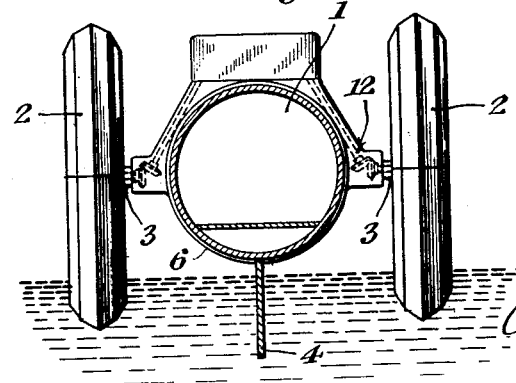
Figure 4:
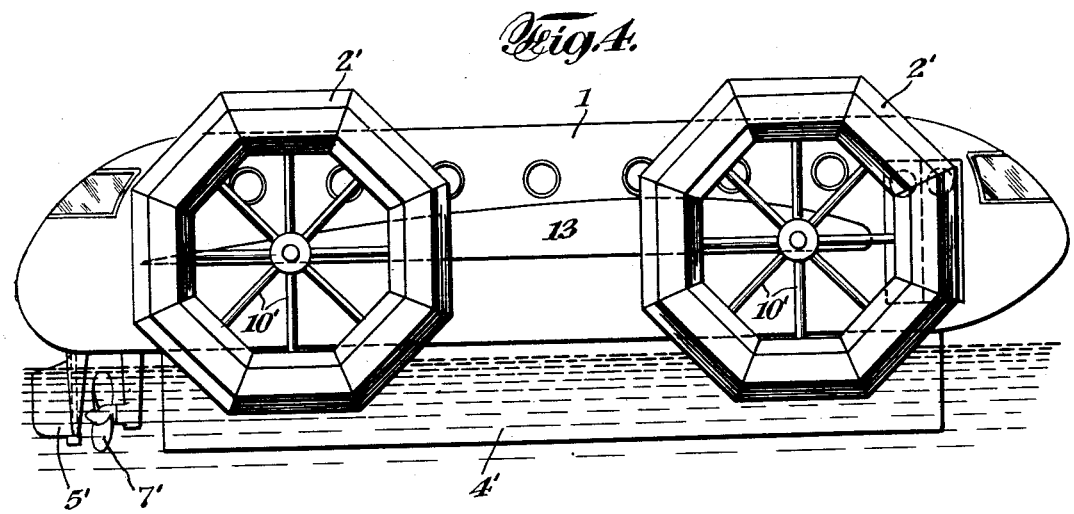
Figure 5:
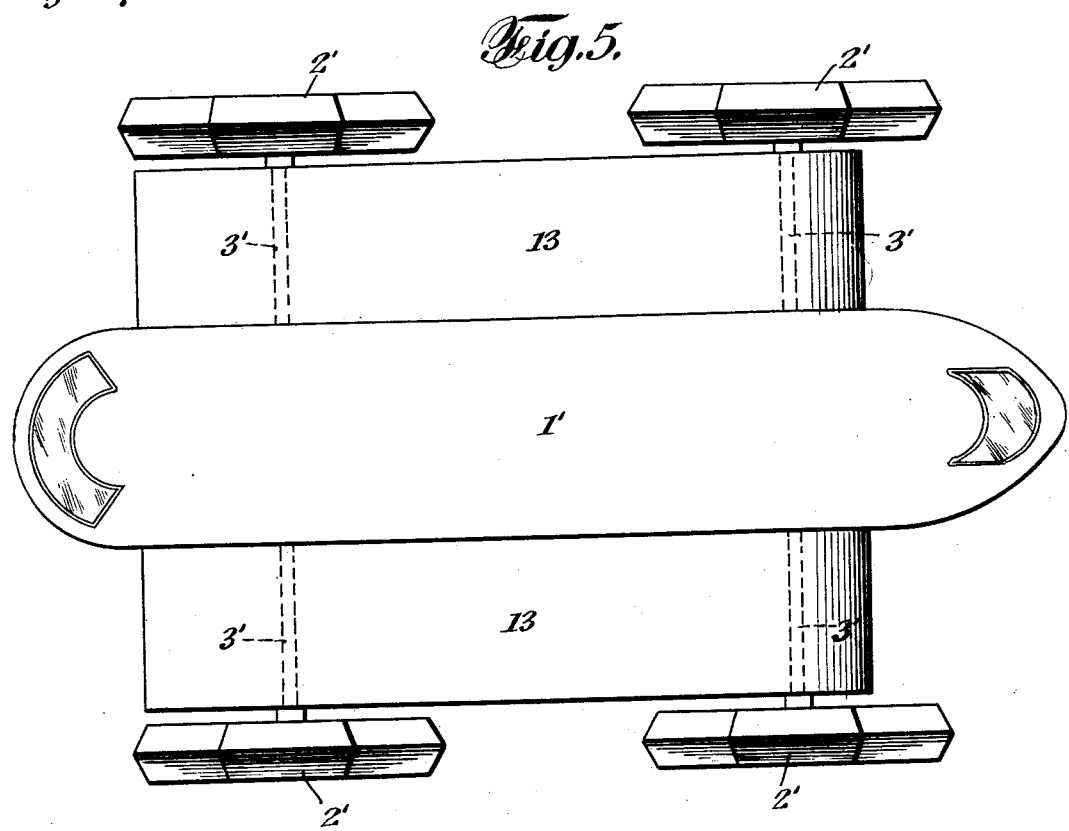

Further objects of the invention, particularly the manner of attaining high speed and conditions of safety, as well as other characteristic details of this new marine vehicle, will appear from the following description taken in connection with the accompanying drawings, in which Fig. 1 is a side view of one form of marine vehicle embodying the invention, Fig. 2 is a plan view in outline of the vehicle shown in Fig. 1, Fig. 3 is a vertical transverse sectional view, Fig. 4 is a side view of another form of vehicle embodying the invention, and Fig. 5 is a plan view in outline of the vehicle shown in Fig. 4.

In the embodiment of the invention illustrated in the drawings the marine vehicle comprises a car 1, 1' which rests upon four floaters 2, 2' by means of axles 3, 3' so as to provide support for the car over the water without any flotation of the car by itself. One or more blades or fins 4, 4' protrude from the bottom as shown in Figs. 1 and 2, which blades are submerged in the water to hold the direction of the vehicle in its travel forward whether the direction is attained by means of a marine rudder 5, 5' or by employment of a steering system by movement of the floating rotors as in automobiles. The floaters 2, 2' being constituted as closed containers float and are formed to have sufficient buoyancy to support a car of proportionate size and weight as shown, there being employed in the construction of both the car and the floaters a sufficiently light material to avoid overloading. By virtue of the rotary movement of the floaters the vehicle advances or runs over the surface of the water according to the speed imparted to the same by the driving motors, the latter being free to apply their power directly to the propulsion of the vehicle since the body of the vehicle does not push against and collide with the water. The floaters are connected with the body of the car by the supporting bridge structure so that the floaters and the car have correspondence in their swaying or swinging movements, the vehicle being weighted to preserve its center of gravity within the floater support so as to be safely navigable.

In the embodiment of the invention shown in Figs. 1, 2 and 3 the vehicle has the floaters 2 similar to each other and each forming a closed container constituted by six polyhedral sections of octagonal cross section, the said sections being joined in such a way that their maximum intersections form hexagons with six vertices, to each of which is connected a spoke 10 as in a wheel. The floaters 2 being formed hollow and gas tight can hold a gas lighter than air so as to give them a greater buoyancy, but this is not indispensable, and it is sufficient simply for the floaters to be air tight containers with sufficient floating effect to permit the desired rotary movement. The car 1 may be supported from the axles 3 in the usual manner of land vehicles, but having the special feature that the points of support are located near the center plane of the height of the car. The adaptation of the car to the axles is attained by any means permitting each axle to serve at the same time as a support to the car and to have a lateral movement which will not affect the position of the car so that the car will preserve its same level movement whatever the sway or swing of the floaters may be. For this purpose the car 1 is constructed in such proportions that the center of each axle corresponds with the center of the circle forming the circumference of the car in the same plane. For instance as shown in Fig. 3 the ring 6 supporting the car may take any position required by the surge of water without tipping the car laterally. Any other means may be provided permitting the supporting floaters to follow the movement of the waves without correspondingly tipping the car body, which, of course, has its center of gravity below the center of the supporting circle. Finally in order to fix and hold the direction of the vehicle sufficient blades or fins 4 should be provided having substantially the same function as the keel of a ship, it being understood that the blades are not attached to the car but are connected with the frame work supported by the axles of the floaters 2.

In Fig. 2 another form of the marine vehicle of this invention is shown with the floaters 2' similar to each other and each formed as a closed container constituted by eight polyhedral sections, hexagonal in cross section, the said sections being joined in such manner as to form octagons, so that each floater contains eight spokes 10'. The floaters 2' being air tight have the same buoyant qualities described above in connection with the floaters 2, and they hold, as desired, either air or a lighter gas to increase their flotation. The car 1' is supported by the axles 3' having their points of support in the middle plane of the car height, but without any movability between the axles and the car body permitting the axles to adopt lateral movements independent of the car, the axles 3' being rigidly fixed with relation to the body of the car or having only relative rotary movement around their own axes. The car 1', therefore, has to follow the swaying or swinging movements of the floaters 2'. This permits the car 1' to be placed in a somewhat higher position but preserving always the required low point of the center of gravity as is clearly shown in Fig. 2. Finally to hold the direction of progress of the vehicle this form carries one single blade or fin 4' extending along the base of the car.

From the description of the various features shown in the drawings it is evident that both the floaters and the car may be given any desired form without changing the principle of the invention.

The new marine vehicle operates as follows:
Assuming that the propeller action is supplied solely by the marine propeller 7, 7' the initial forward movement is produced in the same manner as in ships. But immediately the resistance exerted by the water causes rotary movement of the floaters whose rotation eliminates the said resistance and the vehicle moves forward at a greater speed than that of any other ship employing the same power. When the propeller force comes only from the propulsion of the floaters as indicated at 12 in Fig. 3 the vehicle moves forward because of this rotation and the travel of the floaters over the water and the shallower the depth of flotation the less is the required propelling force. When the propelling comes from the combined action of the marine propeller and the direct propulsion of the floaters, both forces work together and a still greater speed is attained. If a greater speed is desired all that has to be done is to add one or more air propellers according to any of the known systems, and still greater speed may be attained by filling the floaters with a lighter than air gas, which, while increasing their flotation, will permit greater speed with the same driving power. Finally if it is desired to permit the vehicle running at great speed to avoid the sinuosities of the waves wings may be added as indicated at 13 in Figs. 4 and 5, these wings being of the common type similar to airplanes so that at intervals the vehicle can hold itself in the air, thus avoiding the great troughs formed by the sea when rough weather prevails.

Having thus described my invention, what I claim is:

1. In a marine vehicle the combination of supporting floaters capable of rotary motion, of a frame carried by said floaters and a separate body member supported by said frame and freely rotatable thereon so as to be disconnected from the swaying or swinging movements of the floaters and preserving its own level so as to assure safety in its navigation.

2. A marine vehicle comprising a body portion supported by a plurality of rotary floaters on opposite sides, and means for propelling said vehicle, certain of said floaters comprising wheels narrow in relation to their diameter and having polyhedral peripheries as viewed axially so as to provide propelling projections shaped to be polyhedral in cross section with slanting sides so that the propelling projections enter the water with a wedging action.

3. A marine vehicle comprising a body portion supported by a plurality of rotary floaters on opposite sides, and means for propelling said vehicle, certain of said floaters forming propellers and comprising wheels narrow in relation to their diameter and having polyhedral peripheries as viewed axially so as to provide propelling projections shaped to be polyhedral in cross section with slanting sides so that the propelling projections enter the water with a wedging action, and means for rotating said propelling floaters to apply a propulsive force to said vehicle.

4. A marine vehicle comprising a body portion supported by a plurality of rotary floaters on opposite sides, and means for propelling said vehicle, certain of said floaters comprising wheels narrow in relation to their diameter and having polyhedral peripheries as viewed axially so as to provide propelling projections shaped to be polyhedral in cross section with slanting sides so that the propelling projections enter the water with a wedging action, and each such floater being formed as a closed container adapted to hold a lighter gas than air to increase the buoyancy.

5. A marine vehicle comprising a body portion supported by a plurality of rotary floaters on opposite sides, a bladed propeller applying propulsive force to said vehicle, certain of said floaters comprising wheels narrow in relation to their diameter and having polyhedral peripheries as viewed axially so as to provide propelling projections shaped to be polyhedral in cross section with slanting sides so that the propelling projections enter the water with a wedging action, and means for rotating said propelling floaters to apply an additional propulsive force to said vehicle.

6. A marine vehicle comprising a body portion at the surface of the water and having a keel and a bladed propeller, rotary supporting floaters on each side having horizontal axes midway of said body portion and peripheries extending above and below said body portion, and frame members carried by said floaters and rotatably mounted on the body whereby said body portion is supported for free relative movement around its longitudinal horizontal axis.

ARTURO PEÓN CISNEROS.